United States Patent

Raboin

[19]

[11] Patent Number: 6,090,339
[45] Date of Patent: Jul. 18, 2000

[54] PROCESS FOR MANUFACTURE OF A BLOW MOLDED PLASTIC EXTRUDED PRODUCT

[75] Inventor: Ronald K. Raboin, Depere, Wis.

[73] Assignee: Western Industries, Inc., Milwaukee, Wis.

[21] Appl. No.: 08/899,933

[22] Filed: Jul. 24, 1997

[51] Int. Cl.[7] .................................................. B29C 49/04
[52] U.S. Cl. .......................................... 264/531; 264/540
[58] Field of Search .................................... 264/540, 529, 264/524, 531, 534

[56] References Cited

U.S. PATENT DOCUMENTS

| | | |
|---|---|---|
| 3,050,773 | 8/1962 | Hagen . |
| 3,514,812 | 6/1967 | Evers . |
| 3,535,411 | 10/1970 | Bowles et al. . |
| 3,579,622 | 5/1971 | Shaw et al. ............................... 264/529 |
| 3,792,140 | 2/1974 | Schiemann . |
| 3,792,144 | 2/1974 | Burkett et al. . |
| 3,843,005 | 10/1974 | Uhlig . |
| 3,886,645 | 6/1975 | Schurman ................................ 264/540 |
| 4,029,234 | 6/1977 | Johnson, Jr. et al. ................... 264/540 |
| 4,070,430 | 1/1978 | Confer . |
| 4,176,413 | 12/1979 | Whitney et al. . |
| 4,650,627 | 3/1987 | Peters ...................................... 264/529 |
| 4,761,130 | 8/1988 | Peters . |
| 5,188,849 | 2/1993 | Krall et al. . |
| 5,275,780 | 1/1994 | Robinson ................................ 264/529 |
| 5,346,666 | 9/1994 | Kanoh et al. ............................ 264/529 |

FOREIGN PATENT DOCUMENTS 42-19955  10/1967  Japan ...................................... 264/540

OTHER PUBLICATIONS

Quotation dated Jun. 26, 1996 labeled "Document A" (including related plastics tooling cost estimate).
Confirmation dated Jul. 12, 1996 labeled "Document B".
Meeting notes dated Apr. 26, 1996 labeled "Document C".
Project notes dated Jul. 10, 1996 labeled "Document D".
Meeting notes dated May 14, 1996 labeled "Document E".
Preliminary sketches dated May 3, 1996, labeled "Document F".

*Primary Examiner*—Catherine Timm
*Attorney, Agent, or Firm*—Foley & Lardner

[57] ABSTRACT

A process for blow molding a hollow plastic product comprises introducing a hollow elongated parison of thermoplastic material between a pair of opened sections of a blow mold, and then closing the mold. The mold sections are closed along a linear direction of travel and, when closed, form a mold cavity including a narrow section extending in the direction of travel. The narrow section has a width less than about twice a wall thickness of the parison. As the mold sections close, they sever and enclose a segment of the parison within the mold cavity and shear a double-wall section of the parison into the narrow section to form a reinforcing flange on the product. Upon closing of the mold, a predetermined pressure is provided to an interior of the parison to expand the parison against internal surfaces of the mold cavity to form the remainder of the product. A mold for use in blow molding a hollow plastic product and a one-piece hollow plastic product made by the blow molding process are also disclosed.

11 Claims, 3 Drawing Sheets

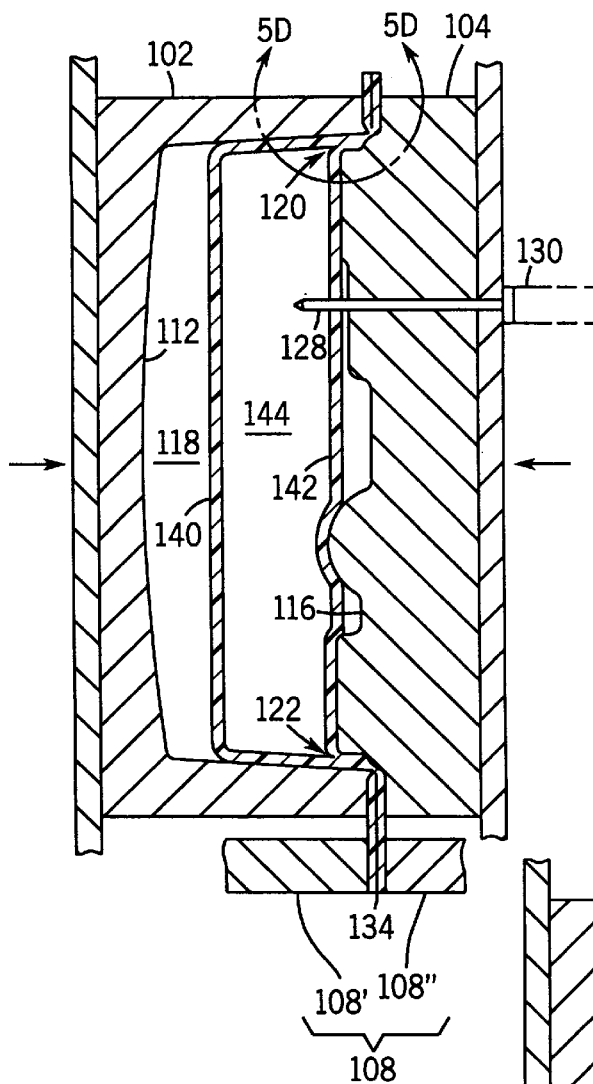
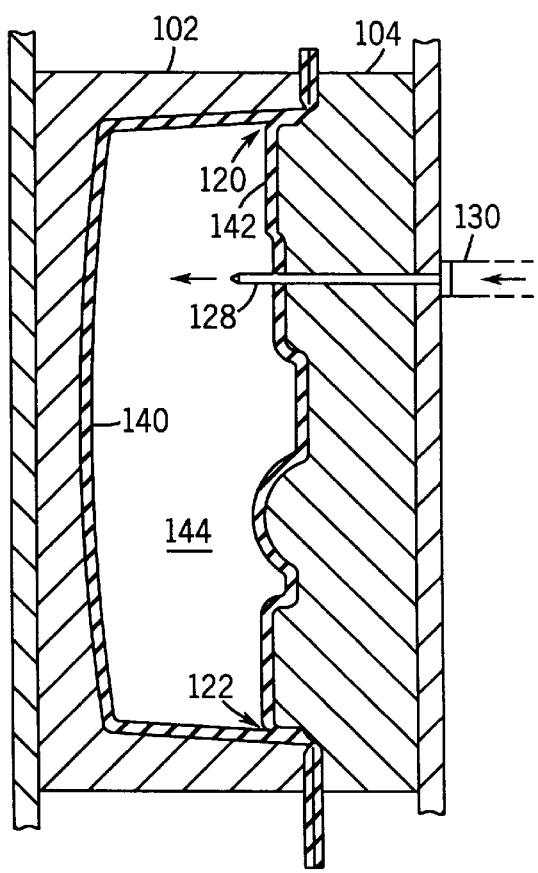

6,090,339

PROCESS FOR MANUFACTURE OF A BLOW MOLDED PLASTIC EXTRUDED PRODUCT

FIELD OF THE INVENTION

The present invention relates generally to the blow molding of thermoplastic material and, more particularly, to a method of blow molding hollow, plastic products. Disclosure is made herein of a unique mold and process for making a blow molded plastic product, and the product derived therefrom.

BACKGROUND OF THE INVENTION

It has been found that blow molding is a relatively inexpensive and efficient process for molding hollow plastic products having substantially uniform wall thicknesses. However, blow molded products often require a wall of increased thickness in certain areas or other type of reinforcing structures such as internal or external ribs or internal columns. In the prior art, blow molding systems are known in which the mold sections (or dies) are moved to bring two layers of parison into contact to form a double-wall segment or a reinforcing column or rib.

Referring more specifically to the double-wall process, the mold cavity typically includes a "narrow section" having a width less than twice the thickness of the wall of the parison. The motion of the dies forces two layers of parison into contact in the narrow section so that they become "press-welded" together to form a solid wall. In such known systems, the solid wall formed on the product is typically parallel to the plane of the mold cavity seam. Stated differently, the narrow section of the cavity is normally transverse to the plane of travel of the two dies.

Another prior art method of forming double-walls in a blow molding operation involves the use of collapsing or telescoping members within the dies. For example, both U.S. Pat. No. 3,050,773 issued Aug. 28, 1962 to Hagen and U.S. Pat. No. 3,843,005 issued Oct. 22, 1974 to Uhlig disclose a method in which parison is expanded into conforming contact with the die cavity, and the die cavity is then reconfigured by the movable members to create double-wall sections.

With the known prior art systems lacking collapsing mold elements, it has not been possible to form double-wall flanges which project transverse to the die cavity seams, that is, parallel to the direction of travel of the dies. On the other hand, the systems employing dies having moving internal mold elements are in general more expensive to design and manufacture, and subject to decreased longevity.

SUMMARY OF THE INVENTION

The present invention provides a blow molded plastic product which includes a reinforcing flange extending transverse to a mold cavity seam, that is, parallel to the direction of travel of the dies. This is accomplished by a shearing action of the parison in a narrow section of the mold cavity which is transverse to the mold cavity seam.

According to a preferred method of the invention, a process for blow molding a hollow plastic product comprises introducing a hollow elongated parison of thermoplastic material between a pair of opened sections of a blow mold, and then closing the mold. The mold sections are closed along a linear direction of travel and, when closed, form a mold cavity including a narrow section extending in the direction of travel. The narrow section has a width less than about twice a wall thickness of the parison. As the mold sections close, they sever and enclose a segment of the parison within the mold cavity and shear a double-wall section of the parison into the narrow section to form a reinforcing flange on the product. Upon closing of the mold, a predetermined pressure is provided to an interior of the parison to expand the parison against internal surfaces of the mold cavity to form the remainder of the product.

The present invention also includes a mold for use in blow molding a hollow plastic product. The mold comprises a first mold section having a first cavity and a second mold section having a core. The mold sections engage one another along a linear direction of travel to form a closed mold in which the first cavity and the core combine to form a second cavity including at least one narrow section extending in the direction of travel. The narrow section has a width less than about twice the thickness of a wall forming the hollow plastic product.

The present invention also includes a one-piece hollow plastic product. The product comprises a hollow body defined by integrally formed walls including a bottom wall, a top wall, a front wall, a back wall, and left and right side walls. The product has a mold line extending around a perimeter of the body, which mold line lies generally in a plane. The product also has at least one reinforcing flange projecting away from the body in a direction transverse to the plane.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 5C is a view similar to FIG. 5A, with the mold halves closed around the parison in a pre-blown state;

FIG. 5E is a view similar to FIG. 5C, but with the parison fully blown to conform with the mold cavity.

DETAILED DESCRIPTION OF A PREFERRED EXEMPLARY EMBODIMENT

The present invention relates generally to the molding of hollow plastic products of one-piece construction having a reinforcing flange of increased thickness when compared to the wall thickness of the remainder of the product.

Before proceeding with a description of the Figures which illustrate a particular embodiment of the present invention, several general comments should be made about the applicability and scope of the invention. First, while the present invention is illustrated in connection with a shell for motorcycle saddle bags, the invention has wider applicability for use in other applications such as for gas tanks, containers, drums, insulated coolers, and seats, to name just a few. Second, while the product depicted has a generally rectangular cross-sectional shape (see FIG. 2), the shape is not critical to the present invention. That is, the reinforcing flange can be formed on products having other geometric cross-sectional shapes or an irregular cross-sectional shape, limited only by the blow molding process as outlined below.

With regard to the selection of materials, the blow molded product in its preferred embodiment is made from a high-density polyethylene (HDPE). However, a number of other suitable thermoplastic resins could be used such as polyvinyl chloride (PVC), polyethylene terephthelate (PET), and polypropylene. Additional materials sometimes used in blow molding are specified in The Plastic Blow Molding Handbook, copyright 1990 by Van Nostrand Reinhold.

With regard to the blow molding process employed, the invention is easily carried out on a wide number of commercially available blow molding machines. However, no attempt will be made to specify a particular machine because of the variances in features and control systems available in such machines and, more importantly, because the choice will depend greatly on the particular product and number of units to be produced. In general, however, the depicted product can be made on a 30–35 pounds maximum shot size accumulator type machine or an equivalent capacity continuous extrusion machine.

Figure 1:
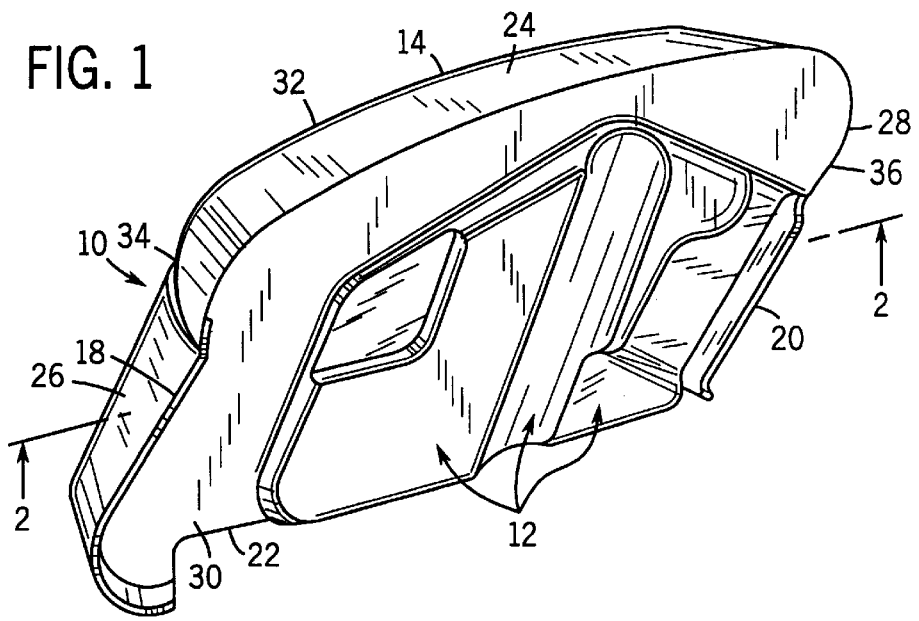
FIG. 1 is a perspective view of a blow molded plastic product embodying the invention, the particular product being a motorcycle saddlebag shell.

Proceeding now with a description of the illustrated embodiments, FIG. 1 shows a thermoplastic product 10 of the blow molded type depicted as a shell for motorcycle saddlebags. Product 10 has a number of ridges, depressions and so forth along one side thereof generally designated as 12, which are provided for the particular end use of product 10 and are not important to the description of the invention.

Figure 2:
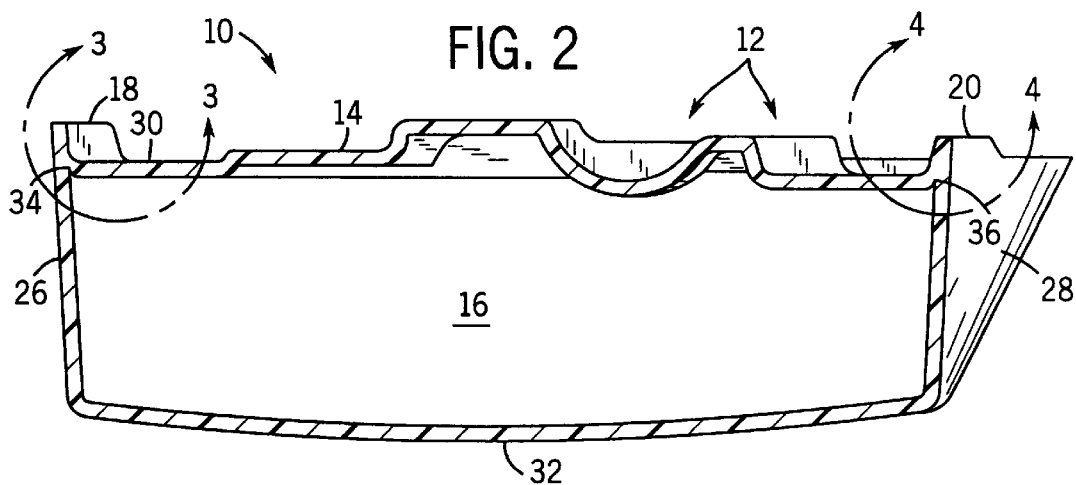
FIG. 2 is a cross-sectional view of the product of FIG. 1 taken along line 2—2 shown in FIG. 1, showing the wall structure of the product.

Referring now to FIGS. 1 and 2, product 10 comprises a relatively deep body 14 having a hollow interior 16 and a pair of reinforcing flanges 18 and 20 extending along opposed ends of body 14. Body 14 is of single wall construction including a bottom wall 22, a top wall 24, a front wall 26, a back wall 28, a left side wall 30 and a right side wall 32 (the designations left, right and so forth refer to the orientation of the saddle bag as it would be mounted on the motorcycle). Walls 22, 24, 26, 28, 30 and 32 are integrally formed together with flanges 18 and 20 in a single blow molding operation as will be explained below.

Figure 3:
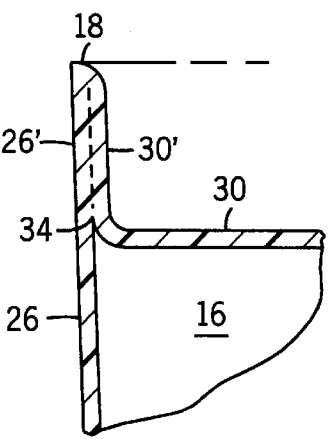
FIG. 3 is an enlarged cross-sectional view of a reinforcing flange and adjacent wall structure showing the portion thereof bounded by line 3—3 shown in FIG. 2.
Figure 4:
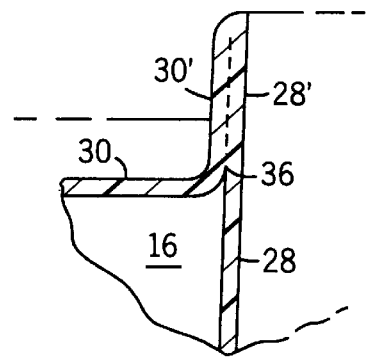
FIG. 4 is an enlarged cross-sectional view of another reinforcing flange and adjacent wall structure showing the portion thereof bounded by line 4—4 shown in FIG. 2.

Reinforcing flanges 18 and 20 are integrally formed with body 14 and project substantially normal to left side wall 30 along opposite sides thereof. In particular, flange 18 extends along an edge 34 formed by the intersection of left side wall 30 and front wall 26, and flange 20 extends along an edge 36 formed by the intersection of left side wall 30 and back wall 28. Flanges 18 and 20 are of double-wall construction, that is, approximately twice the thickness of walls 22, 24, 26, 28, 30 and 32 forming body 14. As best shown in the enlarged views of FIGS. 3 and 4, flanges 18 and 20 comprise two layers of parison 30', 26' and 30', 28', respectively, which have been "welded" together to form a solid wall. The specific molding process by which this "welding" occurs involves a shearing motion which will be described below in reference to a preferred process for making product 10.

Figure 5A:
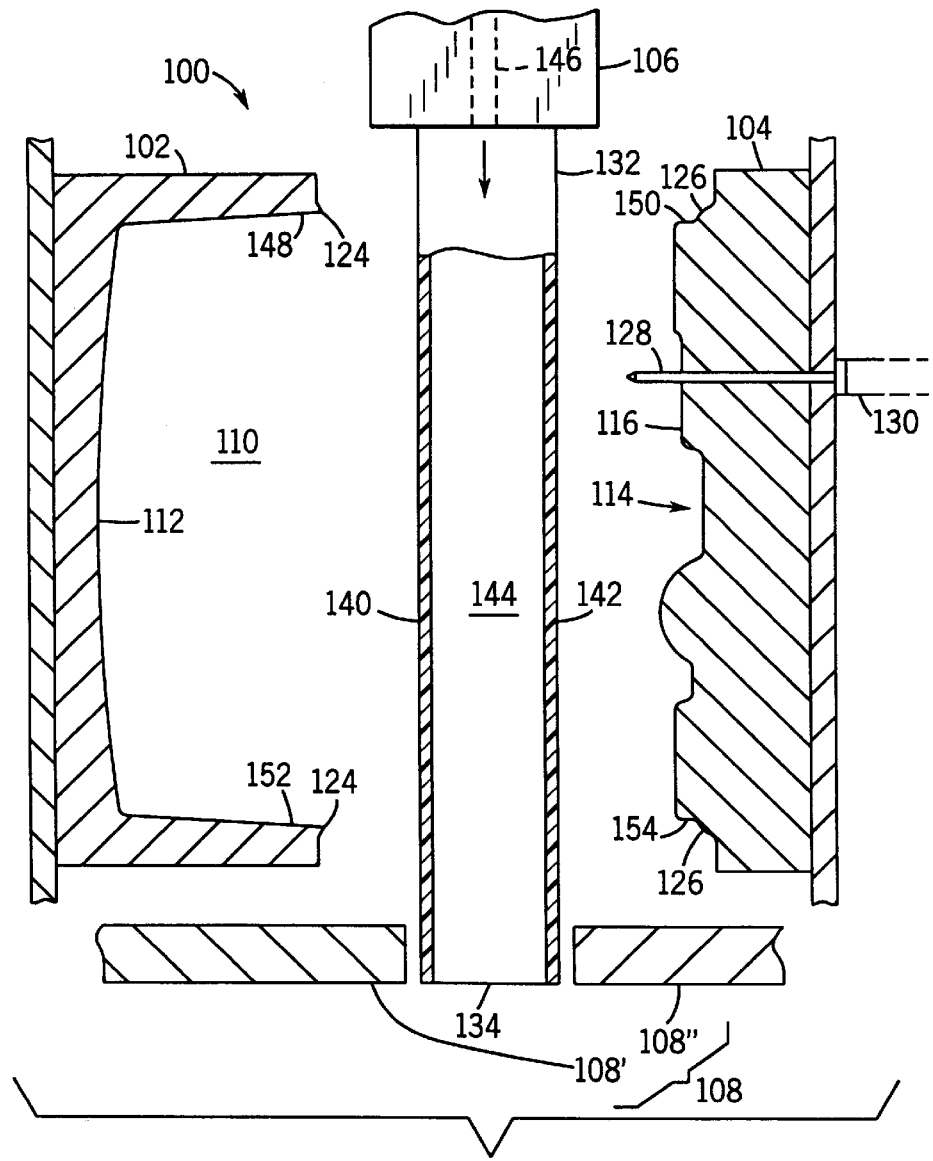
FIGS. 5A is a generally schematic view of the molding operation, showing an extruded parison between opened mold halves of the blow mold with portions thereof being in cross-section and fragmentary portions thereof being broken away.

With reference now to FIG. 5A, a blowing mold generally designated as 100 suitable for molding product 10 will now be described. Mold 100 includes a pair of mold sections 102 and 104, an extrusion die 106, and an optional clamping device indicated generally as 108. Mold sections 102 and 104 are conventional in that they are preferably cast or cut from aluminum, but they may be fitted with non-conventional alloy inserts in certain areas where noted below to improve durability. Mold sections 102 and 104 are preferably mounted side-by-side and are moved between an open and a closed mold position along linear horizontal directions of travel by conventional drive means (not shown).

Figure 5B:
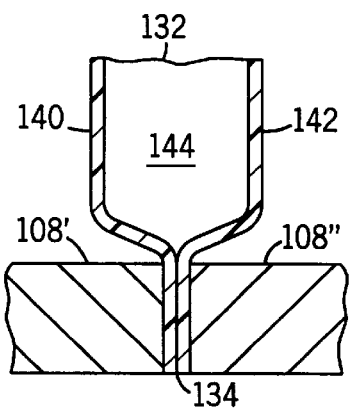
FIG. 5B is an enlarged, cross-sectional view of the bottom end of the parison being clamped shut by mating jaws of a closure device to seal the bottom of the parison prior to closing the mold halves.
Figure 5D:
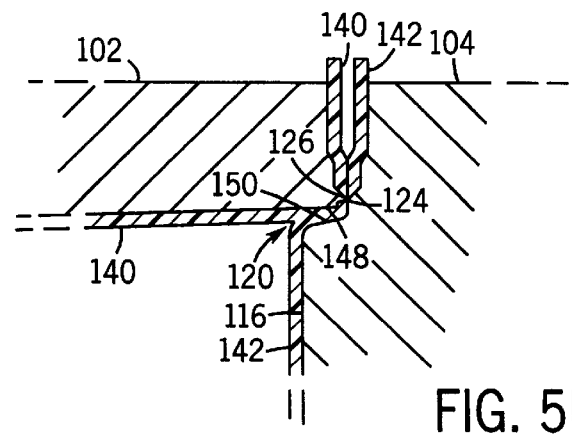
FIG. 5D is an enlarged, cross-sectional view of one reinforcing flange being formed between the mold halves, the portion shown being bounded by line 5D—5D shown in FIG. 5C.

Mold section 102 has a cavity 110 defined by a concave surface 112, and mold section 104 has a slightly raised area or core 114 having a contoured surface 116 that corresponds to the desired shape of left side wall 30 of product 10. Mold sections 102 and 104 engage one another in the closed position (see FIG. 5C) to form a mold cavity 118 bounded by surfaces 112 and 116, which together define the outer surface configuration of product 10. Mold cavity 118 includes a pair of narrow sections 120 and 122 (see FIGS. 5C and 5D) corresponding to reinforcing flanges 18 and 20, respectively, on product 10. Narrow sections 120 and 122 are horizontally oriented, that is, extend in the direction of travel of mold sections 102 and 104, and are configured (as will be explained further below with reference to the process) to receive two layers of parison therein upon closing movement of mold sections 102 and 104.

Mold section 102 is provided with a knife-edge formation 124 (see FIG. 5A) extending completely around mold cavity 118. Upon closing of mold 100, knife-edge formation 124 engages a complementary shoulder 126 surrounding core 114 which serves as a bed plate for knife-edge 124. Thus, knife-edge 124 and shoulder 126 are provided for severing and enclosing a portion of parison within mold cavity 118. Mold section 104 is also provided with a needle 128 for introducing expansion fluid into the enclosed parison portion. More specifically, needle 128 is mounted to extend through mold section 104 and project horizontally inwardly from contoured surface 116 into mold cavity 118. A source of compressed air (not shown) is fluidly coupled through a conduit 130 to needle 128 for expanding the enclosed parison portion into engagement with surfaces 112 and 116, so that it assumes the shape of mold cavity 118 (see FIG. 5E).

Turning initially to FIG. 5A, the specific process steps for making product 10 using mold 100 will now be described. Mold 100 is shown in FIG. 5A in the open mold position with a molten plastic material being introduced between mold sections 102 and 104. More specifically, extrusion die 106 is shown extruding a tubular parison 132 downwardly by gravity feed with a lower (or free) end 134 thereof extending a sufficient distance below mold sections 102 and 104. At this point, clamping device 108 (illustrated in FIG. 5A as an open pair of horizontally opposed clamps 108' and 108") substantially seals lower end 134 by pinching together opposed walls 140 and 142 of parison 132 (see FIG. 5B).

Clamps 108' and 108" may be moved by conventional drive means independently of mold sections 102 and 104, or they may be coupled to mold sections 102 and 104, respectively, with some sort of compensating device provided to allow clamps 108' and 108" to engage one another prior to full closure of mold 100, yet not prevent full closure of the mold. Preferably, a pre-blow air pressure is introduced to an interior 144 of tubular parison 132 (before or after lower end 134 is sealed) through an air passage 146 provided in extrusion die 106. This pre-blow air pressure helps prevent deformation or draping of the tubular parison 132 during subsequent molding steps.

As mold sections 102 and 104 move toward a closed position about tubular parison 132, parison 132 is transformed in shape and urged into narrow sections 120 and 122. More specifically, the converging (or collapsing) motion of mold sections 102 and 104 causes tubular parison 132 to flatten into a double-wall thickness which is simultaneously directed into narrow section 120 between opposing surfaces 148 and 150 (see FIG. 5A) and, similarly, a double-wall thickness of parison 132 is also directed into narrow section 122 between opposing surfaces 152 and 154. Surfaces 148, 150, 152 and 154 may optionally be provided with thin alloy inserts (not shown), or a thin coating of an alloy material may be applied to the aluminum to provide some additional durability.

Opposing surfaces 148 and 150, and opposing surfaces 152 and 154, are each spaced from one another by less than (or at least not greater than) about the double-wall thickness of parison 132. Thus, during the final closing movement of mold sections 102 and 104, the double-wall thickness of thermoplastic material that is urged into narrow sections 120 and 122 is subjected to a shearing motion and hydrostatic loading (i.e., compression) between surfaces 148 and 150 and surfaces 152 and 154, respectively, which are traveling in opposite directions to one another. The shearing of the molten thermoplastic material, coupled with the hydrostatic loading resulting from the specific dimensions of narrow sections 120 and 122, causes fusion to occur which ensures efficient and permanent bonding.

Turning now to FIG. 5C, mold sections 102 and 104 are shown fully closed with needle 128 extending through wall 142 of tubular parison 132. Undesired inward collapsing, draping, or deforming of tubular parison 132 is avoided during insertion of needle 128 by the pre-blow air pressure previously provided inside parison 132. Pressurized air is introduced through needle 128 into interior 144 of parison tube 132 to expand parison 132 into conformance with surfaces 112 and 116 of mold cavity 118, as shown in FIG. 5E. To facilitate the blowing, air is preferably eliminated from between the expanding parison 132 and mold sections 102 and 104 by suitable venting of cavity surfaces 112 and 116.

After blowing is complete, the molded plastic is preferably cooled by conventional means such as by cooling water ducts (not shown) in mold sections 102 and 104 to externally cool the plastic, and/or by introducing for example water, carbon dioxide, or nitrogen through needle 128 to internally cool the molten plastic. However accomplished, the cooling operation sets the molded plastic, causing it to retain the mold configuration. After the molded plastic has set for a short period of time, mold sections 102 and 104 are opened and product 10 is removed therefrom.

Without intending to be limiting in any way, some specific parameters will now be provided for molding the saddle bag shell depicted in the Figures. These parameters, however, will vary greatly depending on such factors as the size and shape of the molded product, the molding material used, and the capabilities of the blow molding machine itself. The preferred molding material is high density polyethylene because it is reasonable stiff and durable, easily processed, and relatively low cost. The polyethylene is initially extruded at about 375° F., the pre-blow pressure is between about 5–10 lbs. PSIG, the primary blow pressure is between about 90–105 lbs. PSIG, and the shell is allowed to cool for about 180 seconds before the mold is opened. As for particular dimensions, the tubular extrusion has an initial wall thickness of between about 0.280 to 0.312 inches, which is blown out to between about 0.08 to 0.10 inches of wall thickness for body 14. The compression molded wall section, i.e., reinforcing flanges 18 and 20, is between about 0.13 to 0.15 inches thick.

Finally, it should be noted that the feeding of the raw thermoplastic material into extrusion die 106, the parison extruding operation, the opening and closing of mold sections 102 and 104, the cooling thereof, the supplying of air under pressure thereto, and the introduction of expansion fluid into tubular parison 132 are all controlled in a timed relationship by suitable a control device. Since such controls are conventional, they are not shown in the Figures and it is believed that no further description or amplification is necessary.

Although a variety of embodiments have been described herein, it should be understood that the above description is of preferred exemplary embodiments of the present invention, and that the invention is not limited to the specific forms described. For example, the parison could be pulled up from below rather than gravity fed from above, or the mold sections could move into and out of engagement along a vertical plane rather than horizontal. In addition, the mold halves need not be of the depicted one cavity and one core type, but could both be female mold halves. Such other constructions are, nevertheless, considered within the scope of this invention. Accordingly, these and other substitutions, modifications, changes and omissions may be made in the design and arrangement of the elements and in their method of operation as disclosed herein without departing from the scope of the appended claims.

What is claimed is:

1. A process for blow molding a hollow plastic product having a first wall and a second wall with an intersection therebetween, comprising:

introducing a hollow elongated parison of plastic material between a pair of opened sections of a blow mold, at least one of the mold sections configured to move along a linear direction of travel toward the other of the mold sections to engage therewith and form a mold cavity including at least one narrow section extending in the direction of travel, the narrow section having a width less than about twice a wall thickness of the parison;

moving the at least one of the mold sections toward the other of the mold sections and into engagement about the parison to thereby close the mold and shear a double-wall section of the parison into the narrow section to form a flange on the product; and providing a predetermined pressure to an interior of the parison to thereby expand the parison against internal surfaces of the mold cavity to form the remainder of the product wherein the flange has a substantially constant width and runs along the first wall a distance greater than the length the flange protrudes outward from the first wall and further wherein the reinforcing flange runs curvilinearly along the intersection of the first and second walls.

2. The process of claim 1, wherein the narrow section extends along an exterior edge of the mold cavity adjacent a seam of the mold.

3. The process of claim 1, wherein the width of the narrow section is such that the double-wall section of the parison is hydrostatic loaded during the shearing motion.

4. The process of claim 1, wherein the mold is a two part mold and the mold cavity is without any movable sections.

5. The process of claim 1, wherein introducing the hollow elongated parison comprises downwardly extruding a tubular column of parison between the mold sections.

6. The process of claim 5, further comprising applying a pre-blow pressure to an interior of the column through a top end thereof prior to closing the mold.

7. The process of claim 5, further comprising closing a bottom end of the column prior to closing the mold to initiate expansion of the tubular column.

8. The process of claim 1, wherein providing the predetermined pressure comprises:

inserting a needle through a wall of the parison as the mold sections move together; and blowing air through the needle.

9. The process of claim 1, wherein the mold is closed by simultaneously moving both mold sections horizontally toward one another.

10. A process for blow molding a motorcycle saddlebag shell, comprising:

introducing a hollow elongated parison of plastic material between an opened pair of sections of a blow mold, at least one of the pair of sections configured to move along a linear direction of travel toward at least another of the pair of mold sections to engage therewith and form a mold cavity including at least two narrow sections extending in the direction of travel, the narrow sections having a width less than about twice a wall thickness of the parison;

moving the pair of mold sections together and into engagement about the parison to thereby close the mold, sever and enclose a segment of the parison within the mold cavity, and shear at least two double-wall sections of the parison into the at least two narrow sections to form a forward saddlebag flange extending from a front portion of the parison and a rearward saddlebag flange extending from a rear portion of the parison shell; and providing a predetermined pressure to an interior of the parison after the step of moving to thereby expand the parison against internal surfaces of the mold cavity sufficient to make at least a portion of a front wall of the saddlebag shell substantially coplanar with the forward saddlebag flange out of the front portion of the parison and to make at least a portion of a rear wall of the saddlebag shell substantially coplanar with the rearward saddlebag flange, wherein the step of moving further includes the steps of:

severing the forward saddlebag flange between a first severing edge disposed on one of the pair of sections and a first severing surface disposed on another of the pair of sections to form a severed line substantially coplanar with the first surface; and severing the rearward saddlebag flange between a second severing edge disposed on one of the pair of sections and a second severing surface located on another of the pair of sections, and further wherein the step of severing the rearward saddlebag flange includes the step of providing a curvilinear rearward saddlebag flange extending from both a rear wall and a bottom wall of the saddlebag shell and running along the rear and bottom walls a distance greater than the length the flange protrudes outward from the walls.

11. The process of claim 10, wherein the step of severing the rearward saddlebag flange includes the step of providing a curvilinear rearward saddlebag flange having a substantially constant width.

* * * * *